April 20, 1954 — I. LONSTEIN — 2,676,027
FOLDING CARRIAGE
Filed July 21, 1952 — 2 Sheets-Sheet 1

Irving Lonstein
INVENTOR.

April 20, 1954  I. LONSTEIN  2,676,027
FOLDING CARRIAGE
Filed July 21, 1952  2 Sheets-Sheet 2
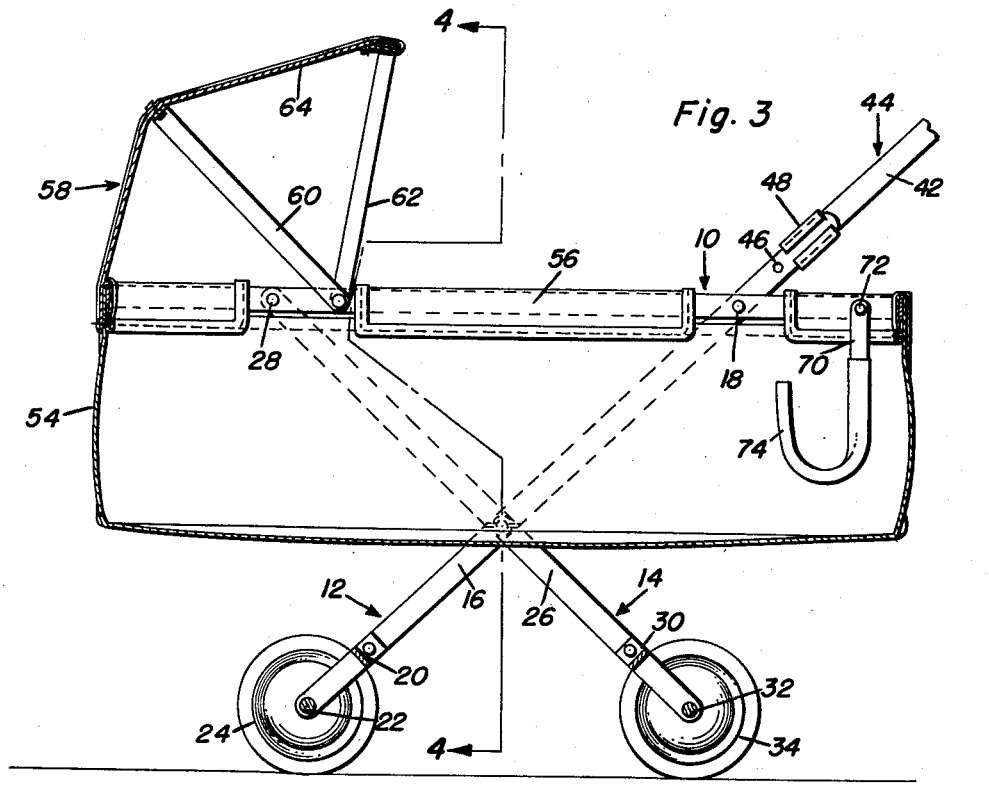
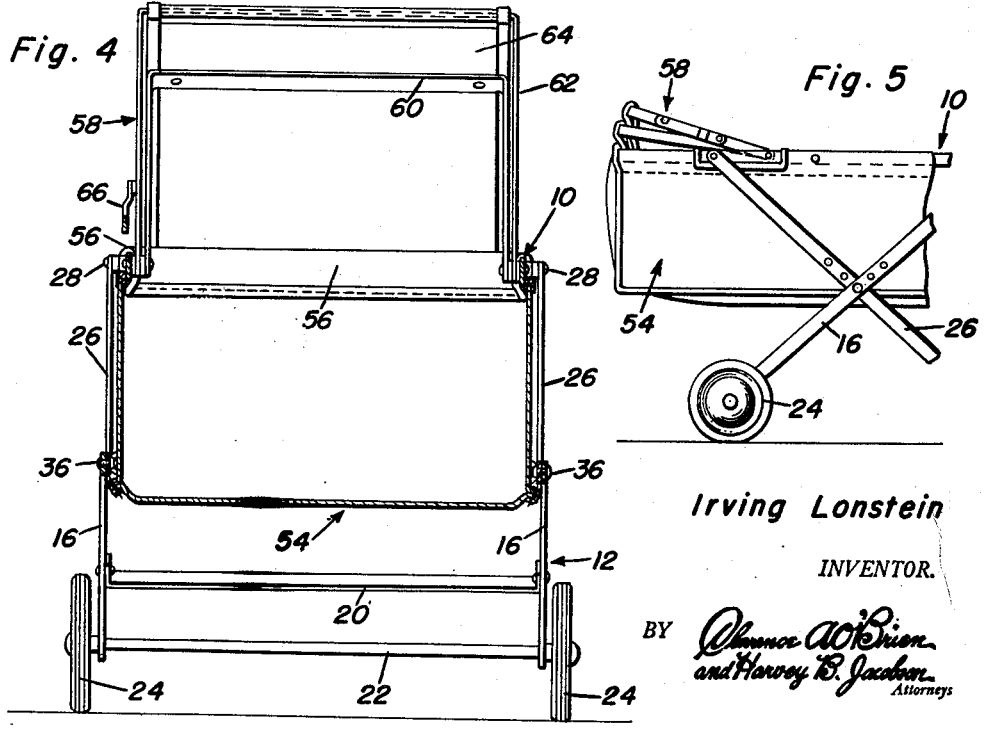
Irving Lonstein
INVENTOR.

Patented Apr. 20, 1954

2,676,027

UNITED STATES PATENT OFFICE 2,676,027

FOLDING CARRIAGE

Irving Lonstein, Bronx, N. Y., assignor to Rondout Metal Products Co., Inc., Bronx, N. Y., a corporation of New York Application July 21, 1952, Serial No. 299,979

2 Claims. (Cl. 280—41)

This invention relates in general to baby carriages, and more specifically to baby carriages which may be folded for storing the same.

The primary object of this invention is to provide an improved folding baby carriage which includes a frame and a supporting base, the supporting base including sets of supports pivotally connected to the frame and selectively connected together whereby the supporting base may be moved from a frame supporting position to a collapsed position.

Another object of this invention is to provide an improved baby carriage having a supporting base, said supporting base being collapsible, said baby carriage also being provided with hangers for hanging the same from the back of a vehicle seat when the supporting base is in a collapsed position.

Another object of this invention is to provide an improved collapsible baby carriage which includes a frame having depending therefrom a flexible body, said frame being supported by a collapsible supporting base, said supporting base having foldably connected thereto a handle, the entire baby carriage being collapsible into a state whereby the height of the same is greatly reduced.

A further object of this invention is to provide an improved folding baby carriage which is of an extremely simple construction whereby the same may be quickly and easily assembled so as to be economically feasible.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 3 is an enlarged fragmentary transverse vertical sectional view taken substantially upon the plane indicated by the section line 3—3 of Figure 2 and shows the general arrangement of the collapsible hood and the construction of a hook hingedly connected to the frame of the baby carriage for supporting the same from the rear of a vehicle seat;

Figure 4 is a transverse vertical sectional view taken substantially upon the plane indicated by the section line 4—4 of Figure 3 and shows the general construction of the baby carriage;

Figure 5 is a fragmentary side elevational view of the front portion of the baby carriage of Figure 1 and shows the hood in the collapsed state.

Similar characters of reference designate similar or identical elements and portions throughout the specification and throughout the different views of the drawings.

Figure 1:
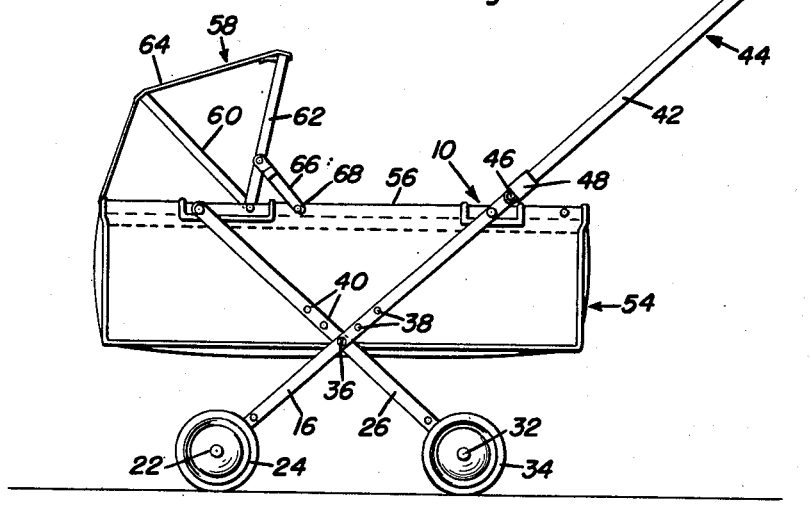
Figure 1 is a side elevational view of the baby carriage, which is the subject of this invention, the handle for the baby carriage and the hood thereof being in extended positions.

Referring now to the drawings in detail, it will be seen that the baby carriage, which is the subject of this invention, and as is best illustrated in Figure 3, includes a generally rectangular frame which is referred to in general by the reference numeral 10. The frame 10 is formed of flat bar stock and has connected thereto for pivotal movement only first and second sets of supports, which are referred to in general by the reference numerals 12 and 14, respectively. The first set of supports 12 includes a pair of downwardly and forwardly extending legs 16 which are in spaced parallel relation and connected to the frame adjacent the upper ends thereof by horizontal pivot pins 18. The lower ends of the legs are connected together by a transversely extending frame member 20, the frame member 20 being connected to the legs 16 adjacent the lower ends thereof. The lower ends of the legs 16 have extending therebetween a transverse axle 22 on which are mounted wheels 24.

The second set of supports 14 includes a pair of downwardly and rearwardly extending legs 26 which are in spaced parallel relation. The legs 26 have their upper ends pivotally connected to the frame 10 adjacent the forward end thereof by horizontal pivot pins 28. The legs 26 are also connected together adjacent their lower ends by a transverse frame member 30, the frame member 30 being identical to the frame member 20. Extending between and secured to the lower ends of the legs 26 is a transverse axle 32 which has mounted on the outer ends thereof wheels 34.

It will be noted that the legs of the two sets of support 12 and 14 are in crossing relation and are selectively connected together by removable fasteners 36. The removable fasteners 36 are selectively positioned in bores 38 and 40 in the legs 16 and 26, respectively.

In order that the baby carriage may be conveniently pushed and at the same time conveniently collapsed in a manner to be explained in more detail hereinafter, the legs 16 have portions which extend upwardly and rearwardly above the frame 10. Pivotally connected to these portions of the legs 16 are downwardly and forwardly extending legs 42 of a handle, which is referred to in general by the reference numeral 44. It will be noted that the lower ends of the legs 42 are pivotally connected to the legs 16 by horizontal pivot pins 46 and are free to be folded with respect thereto. In order that the legs 42 may be retained in their positions as extensions of the legs 16, they are provided with an elongated flat sleeve 48 which is slidably mounted thereon. The sleeve 48 is adapted to engage around the upper ends of the legs 16, and the lower ends of the legs 42 to prevent the pivotal movement between the two sets of legs. The handle 44 is completed by a transverse portion 50 which is integral with the upper ends of the legs 42 and extend therebetween. The transverse portion 50 is provided with a suitable grip element 52 which is mounted thereon and extends substantially the full length thereof.

It will be noted that the body of the baby carriage is flexible and is in the form of a generally rectangular container which is formed of canvas or like material, the body portion being referred to in general by the reference numeral 54. The upper edges of the body portion 54 are doubled over to provide elongated sleeves 56 in which the frame 10 is disposed. In order that the legs 16 and 26 may be connected to the frame 10, the sleeves 56 are interrupted at spaced intervals to provide a clearance for the connections of the legs and the frame.

Secured to the forward portion of the frame 10 is a collapsible hood, which is referred to in general by the reference numeral 58. The hood 58 includes a pair of hoops 60 and 62 which are pivotally connected to the frame 10 and which supports a flexible covering 64. The flexible covering 64 has one edge thereof connected to the body 54 and the other or rear edge thereof connected to the hoop 62. The hoop 62 is provided with a brace 66 pivotally connected thereto and having a hooked end which is adapted to be engaged over a fastener 68 carried by the frame 10. When the brace 66 is engaged over the fastener 68 the hood 58 is in its upright position. When it is desired to collapse the hood 58, the brace 66 is disconnected from the fastener 68 and the hoops 60 and 62 folded forward to the position illustrated in Figure 5.

Figure 2:
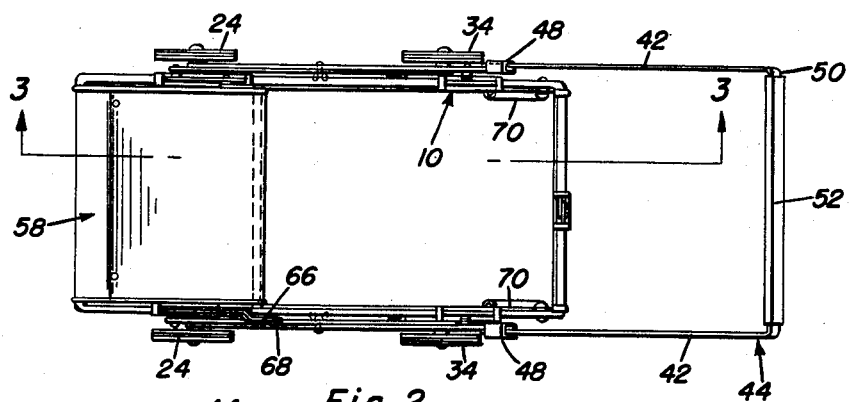
Figure 2 is a top plan view of the baby carriage of Figure 1 and shows the general outline thereof.
Figure 6:
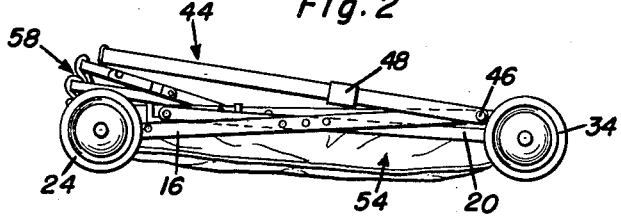
Figure 6 is a side elevational view of the baby carriage of Figure 1 showing the same when it is completely collapsed.

It is intended that the baby carriage, which is the subject of this invention, be conveniently folded so that it may be either stored or conveniently transported. Therefore, when it is desired to collapse the baby carriage the fasteners 36 are removed from their positions connecting together the legs 16 and 26. After the fasteners 36 have been removed, the legs 16 and 26 are free to pivot about their respective pivot pins 18 and 28 to the collapsed positions illustrated in Figure 2. The handle 44 may then be collapsed by sliding the sleeves 48 up the legs 42 and tilting the handle forward to the position illustrated in Figure 2.

While the main purpose of collapsing the legs 16 and 26, and the handle 44 is to permit storage of the baby carriage, it is pointed out that the baby carriage, in its collapsed state, may be utilized as a car bed. In order to so utilize the baby carriage, the frame 10 has pivotally connected thereto adjacent the rear end thereof a pair of hooks 70. The hooks 70 are connected at their ends thereof to the frame 10 by transverse pivot pins 72 and are adapted to be swung up and outwardly of the rear portion of the baby carriage to hook over the back portions of seats of vehicles. In order that the seats, which are not illustrated, may not be damaged by engagement of the hooks 70, the hooks are provided with a covering 74 which may be in the form of rubber tubing or a like material. When the hooks 70 are not being utilized they are folded to the positions illustrated in Figure 3.

It will be seen that by the novel construction illustrated in the drawings, the baby carriage, which is the subject of this invention, is of a relatively simple construction which may be quickly and economically manufactured. Furthermore, the baby carriage has no complicated structure which must be released in order to collapse the same. As pointed out above, the only operation necessary to collapse the baby carriage is to remove the removable fasteners 36. Due to this novel arrangement mothers may quickly and easily collapse the baby carriage, which is the subject of this invention, without requiring mechanical knowledge of the operation of a complicated baby carriage.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A folding carriage comprising a rigid frame, first and second sets of supports directly pivotally secured to said frame, removable means adjustably securing said supports together to form a rigid base for said frame, each of said sets of supports including legs on opposite sides of said frame, a transverse frame member connecting said legs together adjacent the lower ends thereof, the legs of said sets of supports being crossed, wheels carried by the lower ends of said legs, a flexible body connected to and depending from said frame between legs of said supports, said removable means comprising members terminating on the respective sides of said body, one of said sets of supports being provided with extensions extending above said frame, and a handle pivotally secured to said extensions.

2. A folding carriage comprising a rigid frame, first and second sets of U-shaped supports, each of said supports including a pair of spaced parallel legs, the legs of said supports being in crossed relation with upper ends directly pivotally connected to said frame, said crossed legs being adjustably connected together by securing means, said securing means including a plurality of alignable apertures in each pair of crossed legs, an individual removable fastener passing through aligned apertures of each pair of crossed legs, said fasteners being removable to facilitate folding of said supports into the general plane of said frame substantially within the confines thereof, a flexible body connected to said frame and depending therefrom between the legs of said supports, said fasteners terminating on their respective sides of said body, a pair of wheels secured to the lower ends of each of said sets of supports, and a handle pivotally secured to an extension of one of said sets of supports above the frame.

References Cited in the file of this patent

UNITED STATES PATENTS

| Number | Name | Date |
|---|---|---|
| 1,355,039 | Gibson | Oct. 5, 1920 |
| 2,063,242 | Graser | Dec. 8, 1936 |
| 2,155,277 | Kuniholm | Apr. 18, 1939 |
| 2,470,040 | Mackin et al. | May 10, 1949 |

FOREIGN PATENTS

| Number | Country | Date |
|---|---|---|
| 230,172 | Switzerland | Dec. 15, 1943 |
| 355,214 | Germany | June 23, 1922 |